United States Patent [19]
Lee

[11] Patent Number: 5,639,395
[45] Date of Patent: Jun. 17, 1997

[54] MICROWAVE HEATING APPARATUS FOR REDUCING HIGH-FREQUENCY IN AN ELECTRIC POWER CIRCUIT

[75] Inventor: Ki-Yeoung Lee, Daegu-si, Rep. of Korea

[73] Assignee: L. G. Semicon Co., Ltd, Chungcheongbuk-do, Rep. of Korea

[21] Appl. No.: 558,522

[22] Filed: Nov. 16, 1995

[30] Foreign Application Priority Data

Nov. 17, 1994 [KR] Rep. of Korea ................. 1994 30114

[51] Int. Cl.$^6$ ........................................ H05B 6/68
[52] U.S. Cl. ..................... 219/716; 219/702; 363/56
[58] Field of Search ........................ 219/716, 715, 219/702, 717, 718; 363/56, 55, 74

[56] References Cited

U.S. PATENT DOCUMENTS

| | | | |
|---|---|---|---|
| 4,171,517 | 10/1979 | Higa et al. | 327/154 |
| 4,600,823 | 7/1986 | Hiejima | 219/663 |
| 4,766,279 | 8/1988 | Park | 219/716 |
| 4,908,756 | 3/1990 | Higashino | 363/58 |
| 4,931,609 | 6/1990 | Aoki | 219/715 |
| 5,225,973 | 7/1993 | Patel et al. | 363/43 |
| 5,227,964 | 7/1993 | Furuhata | 363/56 |

*Primary Examiner*—Philip H. Leung

[57] ABSTRACT

A microwave heating apparatus is disclosed. The microwave heating apparatus includes: a rectifying section for rectifying an AC current; an inverting section for being turned on/off by the driving signals of a driving section to generate high frequency voltages corresponding to the output signals of the rectifying section; a microwave generating section for receiving the output signals of the inverting section to generate microwaves; a synchronization detecting section for detecting synchronizing signals from the output signals of the inverting section; and a flip flop for being set and reset by the output signals of the synchronization detecting section to control the driving section. The apparatus of the present invention further includes a synchronization control section disposed between the synchronization detecting section and the flip flop, so that the synchronization control section can detect the period of the output signals of the synchronization detecting section to compare it with a reference value so as to reset the flip flop upon encountering a period smaller than the reference value, and so as to prevent the driving section from driving the inverting section.

2 Claims, 4 Drawing Sheets

MICROWAVE HEATING APPARATUS FOR REDUCING HIGH-FREQUENCY IN AN ELECTRIC POWER CIRCUIT

FIELD OF THE INVENTION

The present invention relates to a microwave heating apparatus in which an electric power circuit is protected when noises are occurred in a synchronization detecting section of an electric power circuit of the microwave heating apparatus.

DESCRIPTION OF THE PRIOR ART

A conventional microwave heating apparatus for heating an object with a microwave power of a magnetron includes a mechanism portion for placing and supporting an object to be heated, and further includes a electric power circuitry, as shown in the block diagram of FIG. 1, having a rectifying section, an inverting section, a microwave generating section and a control section.

The rectifying section 11 includes a bridge diode BD1 for rectifying a AC power source, a choke coil CL1 connected to the bridge diode, and a capacitor C1.

The inverting section 12 includes a switching device Q1, a capacitor C2, a diode D1, and a transformer T, for turning on/off the direct current of the rectifying section 11 by being turned on/off by the driving signals of a driving section 14 so as to generate high frequency voltages in a secondary coil.

The microwave generating section 13 includes a capacitor C3, a diode D2 and a magnetron MGT for generating microwave signals from the high frequency voltages of the inverting section 12.

The control section includes a synchronization detecting section 15 for detecting synchronizing signals from the output signals of the inverting section 12, a comparator 18 for comparing the output signals of an output setting section 17 with an average current value of a current detecting section 16 (which detects the high frequency currents), a synchronizing signal generating section 20 for generating synchronizing signals in synchronization with the AC power source, a register incrementing/decrementing section 19 for incrementing and decrementing a counted value of a register 21 in accordance with the output signals of the synchronization signal generating section 20 and in accordance with the output signals of the comparator 18, a counter 22 after receiving the counting values from the register 21 for counting down them in accordance with clock signals from the clock generating section 23 and for outputting an output signal upon encountering zero, and a flip flop 24 for being set in accordance with the output signals of the synchronization detecting section 15 and for being reset in accordance with the output signals of the counter 22 so as to control the driving section 14.

As shown in FIG. 2, the operation of this conventional microwave heating apparatus is carried out in the following manner. That is, the AC power source is rectified by the bridge diodes BD1 of the rectifying section 11, and then, is smoothed by the capacitor C1 and the choke coil CL1 so as to be supplied to a primary coil L1 of the transformer T of the inverting section 12.

In accordance with the driving signals of the driving section 14, the switching device Q1 is turned on/off to supply discontinuous currents to the primary coil of the transformer T so as to induce high frequency voltages in the secondary coils L2, L3 and L4 of the transformer T. These high frequency voltages are rectified by the diode D2 and the capacitor C3 of the high frequency generating section 13 to be supplied to the magnetron MGT. Then the magnetron MGT generates microwaves to heat an object to be heated.

Owing to the resonance synchronization of the inverting section 12, signals shaped like S1 of FIG. 2 are generated in the secondary coil L4 of the transformer T. In synchronization with these signals, the synchronization detecting section 15 generates zero crossing synchronizing signals shaped like S2 of FIG. 2. If the flip flop 24 is set at the falling edge of the synchronizing signal S2, then the driving section 14 is activated to generate signals shaped like S3 of FIG. 2, thereby turning on the switching device Q1 of the inverting section 12.

The current detecting section 16 detects magnitude of current flowing the secondary coil L3 of the transformer to supply the detected current signals to the comparator 18. The comparator 18 compares the detected signals with the preset signals of the output setting section 17 to supply output signals to the register incrementing/decrementing section 19 which increments or decrements the values of the register 21.

Then the register incrementing/decrementing section 19 increments or decrements the register value of the register 21 in accordance with the output signals of the comparator 18 and in accordance with the synchronizing signals of the synchronizing signal generating section 20.

The counter 22 receives the counting value, i.e., the register value of the register 21 to count down the counting value in accordance with the clock signals of the clock generating section 23. When zero arrives after counting, the counter generates an output signal to reset the flip flop 24.

The driving section 14 generates a signal shaped like S3 of FIG. 2 in accordance with the resetting operation of the flip flop 24 so as to turn off the switching device Q1.

The flip flop 24 is set in accordance with the output signals of the synchronization detecting section, and is reset in accordance with the output signals of the counter 22, thereby controlling the driving section 14. The driving section generates signals shaped like S3 of FIG. 2 so as to turn on and off the switching device Q1.

In the above described conventional technique, noises may causes the signal S1 to have a higher frequency S1' which is higher than a reference resonance frequency of FIG. 3, which phenomenon can be generated due to an outside electric and magnetic influences.

In such a case, the output signal S2 of the synchronization detecting section 15 are changed like S2' of FIG. 3, thereby the output signal S3 of the driving section 14 changing like S3' of FIG. 3. Consequently, resulting the switching device Q1 continuously tuning on, an overcurrent like S4' of FIG. 3 flows through the switching device Q1, with the result that the switching device Q1 is damaged.

Generally, the power of the switching device is defined to be $Pd = f \cdot CL \cdot VDD^2$, where f is the switching frequency of the switching device, VDD is the both-terminal voltage of the switching device Q1, and CL is the capacitance of the switching device Q1.

Therefore, if the switching speed is increased, that is, if the switching frequency is increased, then the power is increased, with the result that the device is damaged.

SUMMARY OF THE INVENTION

The present invention is intended to overcome the above described disadvantages of the conventional techniques.

3

Therefore, it is the object of the present invention to provide a microwave heating apparatus in which the edge intervals of the input signal pulses for switching a switching device are detected, so that, if the edge intervals become smaller than a reference value, that is, if the switching frequency becomes higher than a certain value, then the switching device would be turned off, thereby preventing the damage of the switching device. Thus the reliability of the electric power circuit of the microwave heating apparatus is improved.

In achieving the above object, the present invention solves the problem of the conventional technique by disposing a synchronization control section between the synchronization detecting section and the flip flop of the conventional microwave heating apparatus.

That is, the microwave heating apparatus according to the present invention includes a rectifying section for rectifying an AC current, an inverting section for being turned on/off by driving signals of a driving section, to generate high frequency voltages corresponding to the output signals of the rectifying section, a microwave generating section for receiving the output signals of the inverting section to generate microwaves, a synchronization detecting section for detecting synchronizing signals from the output signals of the inverting section, and a flip flop for being set and reset by the output signals of the synchronization detecting section to control the driving section. The apparatus of the present invention further includes a synchronization control section disposed between the synchronization detecting section and the flip flop, so that the synchronization control section can detect the period of the output signals of the synchronization detecting section to compare it with a reference value so as to reset the flip flop upon encountering a period smaller than the reference value, and so as to prevent the driving section from driving the inverting section.

The synchronization control section includes a counter connected to the output signals of the synchronization detecting section, a data setting section for setting a reference value, a comparator for receiving an output of the counter and an output of the data setting section through its two input terminals, and an AND gate for receiving an output of the comparator and the output of the synchronization detecting section through its two input terminals and connecting its output to the flip flop.

BRIEF DESCRIPTION OF THE DRAWINGS

The above object and other advantages of the present invention will become more apparent by describing in detail the preferred embodiment of the present invention with reference to the attached drawings in which:

FIG. 2 illustrates the wave patterns for parts of the signals of the conventional microwave heating apparatus, in which:

S1 is a wave pattern of the signals induced in the secondary coil of an inverting section, S2 is a wave pattern of the synchronizing signals of a synchronization detecting section, and S3 is a wave pattern of the signals inputted from a driving section into a switching device, FIG. 3 illustrates the wave patterns of signals with noises mixed in the conventional microwave heating apparatus, in which:

S1 is the wave pattern of the input signals of the synchronization detecting section, S2 is the wave pattern of the output signals of the synchronization detecting section, S3 is the wave pattern of the output signals of a driving section, and S4 is the wave patterns of a switching device, FIG. 6 illustrates the wave patterns of parts of the signals for the microwave heating apparatus according to the present invention, in which:

S5 is the wave pattern of the input signals of the synchronization detecting section, S6 is the wave pattern of the output signals of the synchronization detecting section, S7 is the wave pattern of the output signals of the synchronization control section, and S8 is the wave pattern of the current signals of the switching device.

DESCRIPTION OF THE PREFERRED EMBODIMENT

Figure 1:
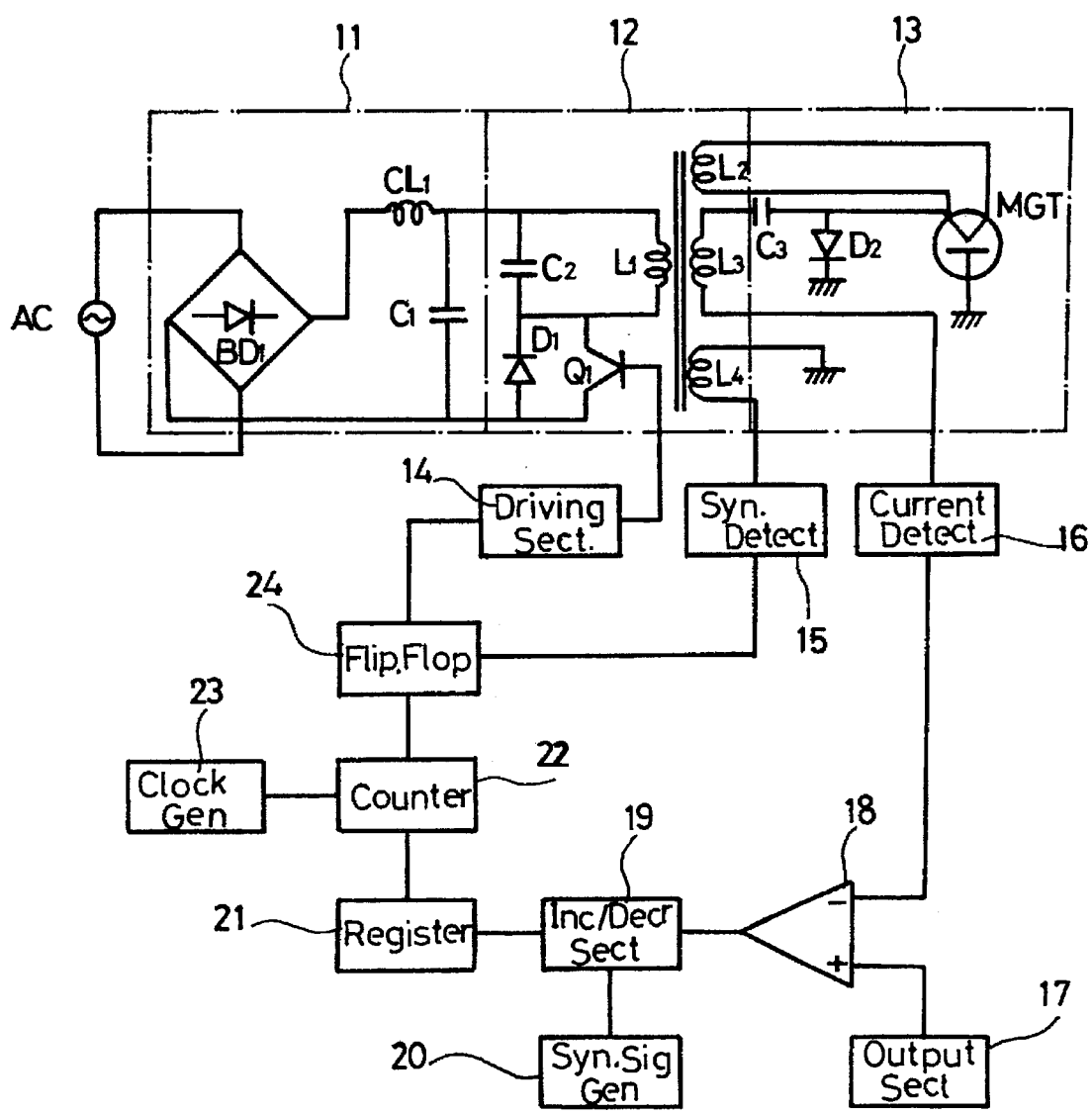
FIG. 1 is a block diagram showing the constitution of the electric power circuit of the conventional microwave heating apparatus.
Figure 2:
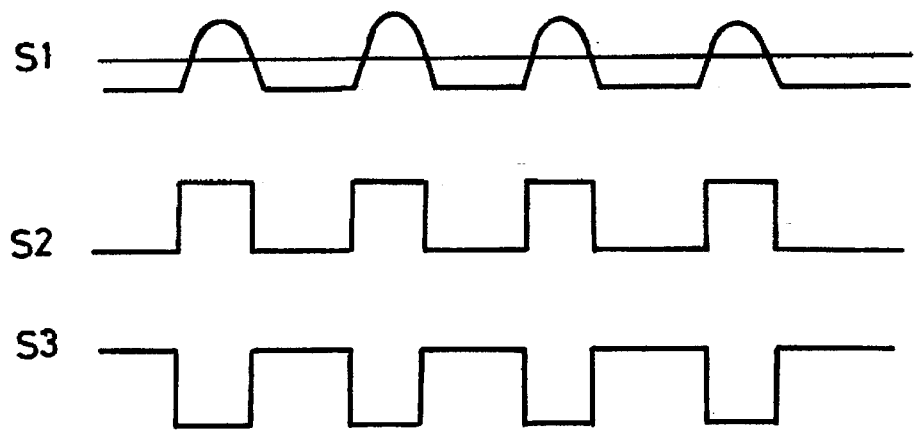
Figure 3:
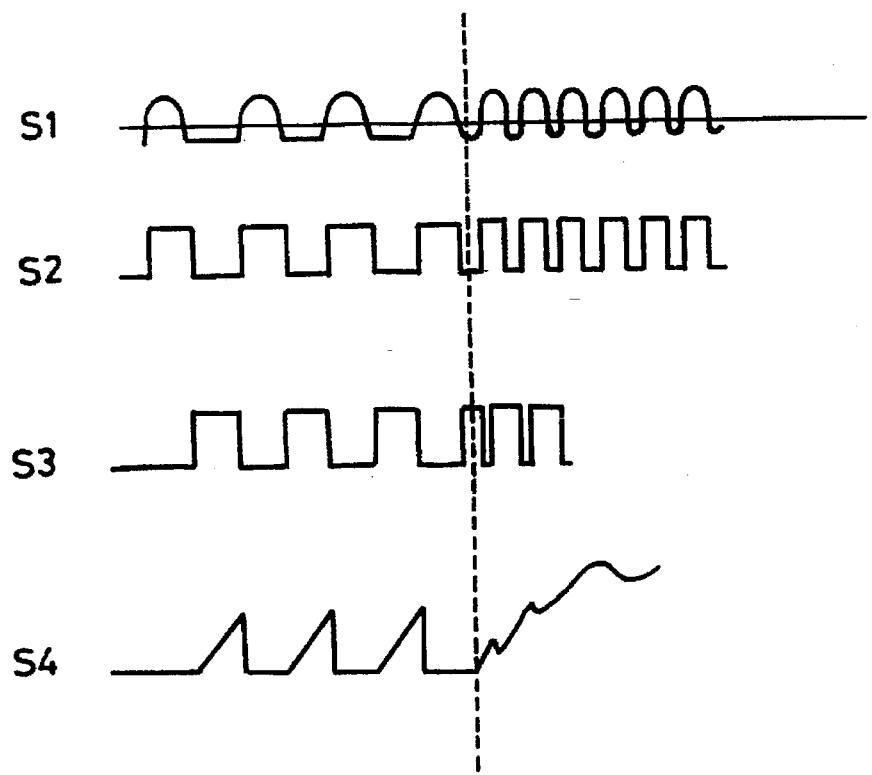
Figure 4:
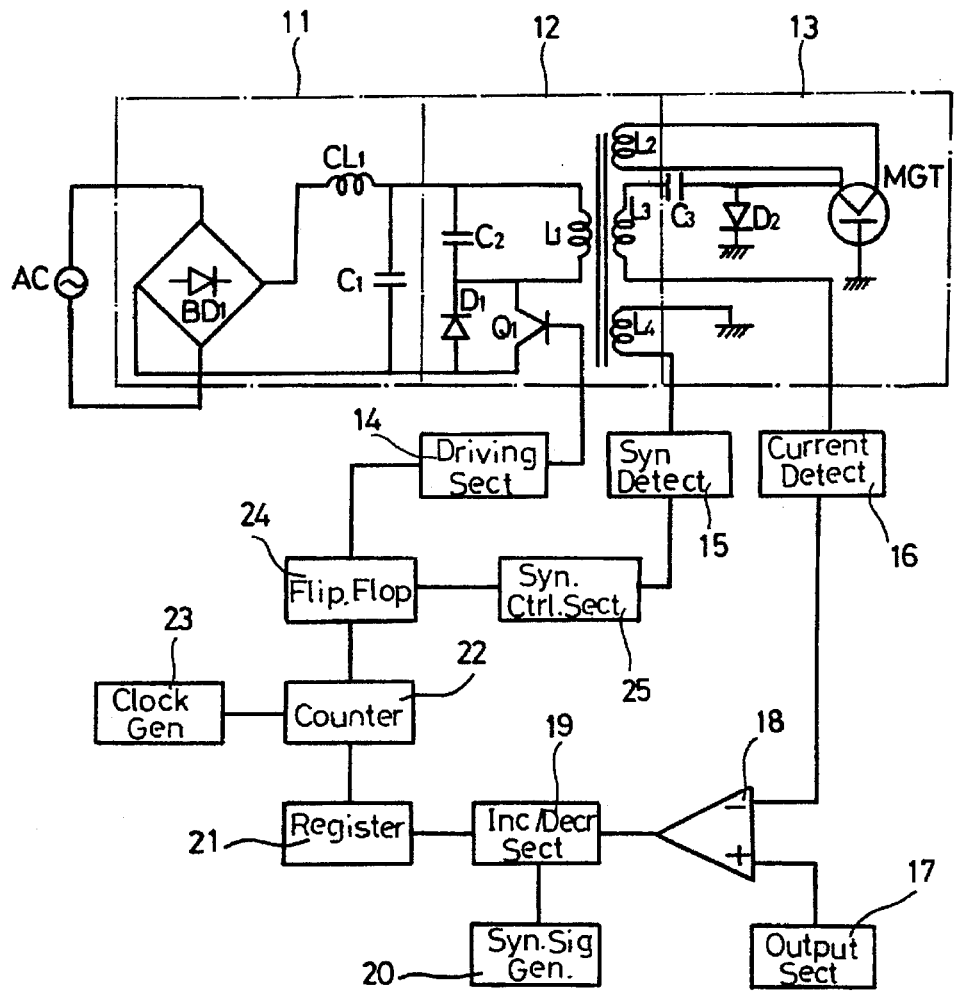
FIG. 4 is a block diagram showing the constitution of the microwave heating apparatus according to the present invention.

As shown in FIG. 4, the constitution of the apparatus of the present invention is same as that of the conventional apparatus, except that a synchronization control section 25 is connected between a synchronization detecting section 15 and a flip flop 24.

Figure 5:
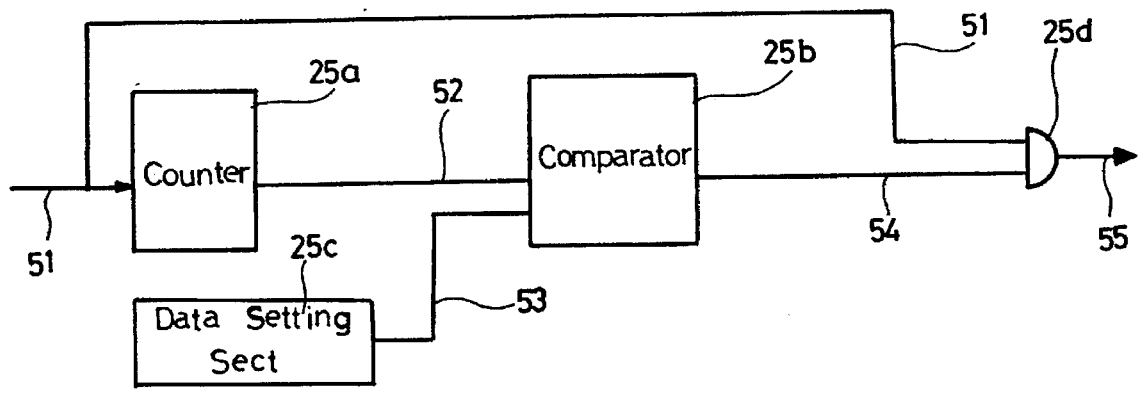
FIG. 5 illustrates the circuit of a synchronization control section according to the present invention.

The synchronization control section 25 is connected between the synchronization detecting section 15 and the flip flop 24 in the following manner. That is, as shown in FIG. 5, a counter 25a is connected to output signals 51 of the synchronization detecting section 15, and an output 52 of the counter is connected to one of two input terminals of a comparator 25b. The other input terminal of the comparator 25b is connected to an output 53 of a data setting section 25c. Two inputs of an AND gate 25d is connected to an output 54 of the comparator 25b and the output 51 of the synchronization detecting section 15 to form logic outputs 55 which is connected to the flip flop 24.

Figure 6:
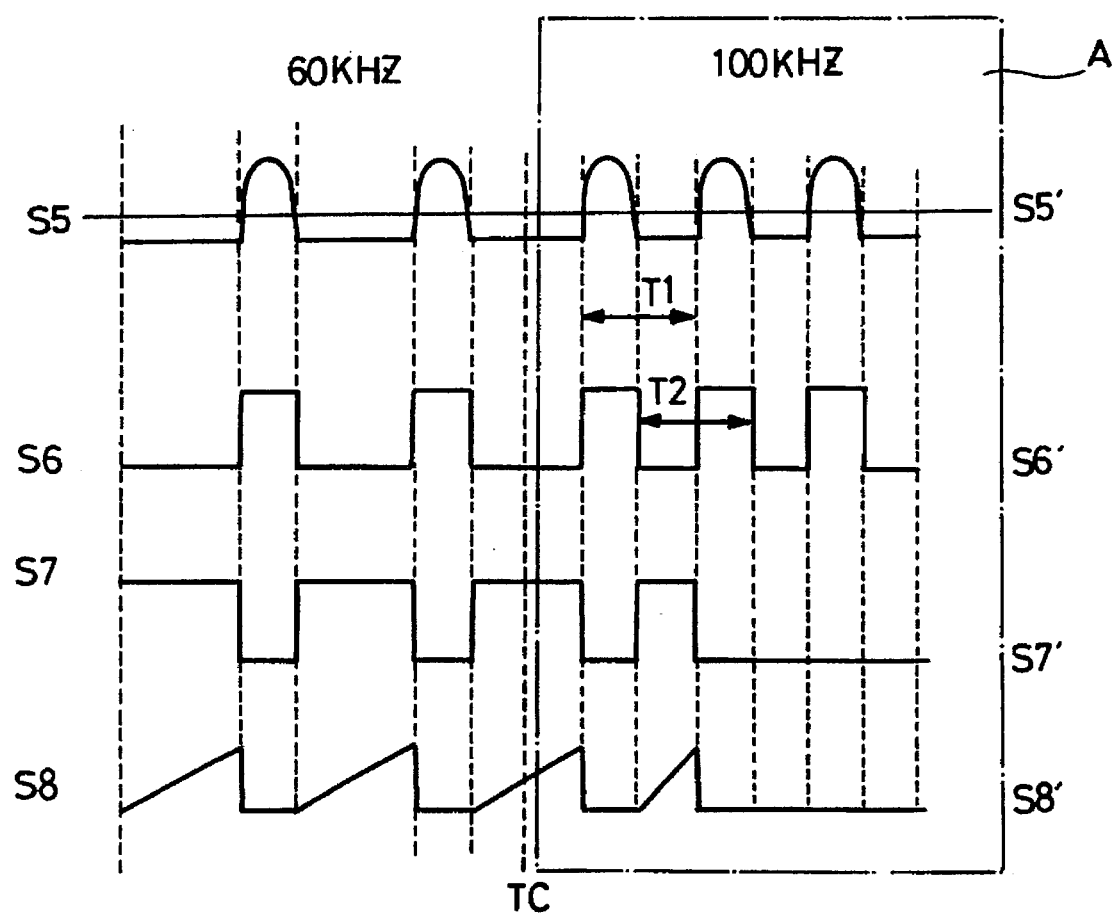

As shown in FIG. 6, the counter 25a detects intervals T1 between the rising edges of the synchronizing signals or intervals T2 between falling edges of the synchronizing signals. For example, the counter 25a counts the number of clocks for the period T1, and outputs the counted result.

The data setting section 25c supplies a set reference value to the comparator 25b.

The comparator 25b compares the counted value 52 for the edge intervals with the reference value 53. If the counted value 52 for the intervals T1 between the rising edges or for the intervals T2 between the falling edges is found to be larger than the reference value, then the output 54 of the comparator 25b becomes high. On the other hand, if the intervals T1 between the rising edges or the intervals T2 between the falling edges are smaller than the reference value 53, that is, if the switching speed becomes faster than the preset value, the output 55 of the comparator becomes low.

The AND gate 25d receives the output 54 of the comparator 25b and the output 51 of the synchronization detecting section 15 to output its output 55 to the flip flop 24. When the output 54 is high, then the AND gate 25d permits the output 51 of the synchronization detecting section 15 to go as output 55 to the flip flop 24. If the output 54 is low, the signal 51 can not pass through the AND gate.

The operation of the apparatus of the present invention constituted as described above is same as that of the conventional apparatus, except the operation of the synchronization control section 25.

That is, when the power source AC is supplied, the rectifying circuit generates a rectified output. The invertor 12 operates in such a manner that the switching device Q1 is turned on/off by the driving signals of the driving section 14 so as to supply discontinuous currents to the primary coil of the transformer T, thereby inducing high frequency voltages in the secondary coils L2, L3 and L4 of the transformer. These high frequency voltages are rectified by the capacitor C3 and the diode D2 of the high frequency generating section 13, and then, are supplied to the magnetron MGT, so that the magnetron MGT would oscillate to generate microwaves and to heat the object to be heated.

In the normal operating procedure, signals shaped like S5 of FIG. 6 are induced in the secondary coil L4 of the transformer T in accordance with the resonance synchronization. In synchronization with these signals, the synchronization detecting section 15 generates a zero crossing synchronization signal 51 shaped like S6 of FIG. 6. This synchronizing signal 51 passes through the synchronization control section 25 to be supplied to the flip flop 24, thereby setting the flip flop 24 at the falling edge of S6. Consequently, the driving section 14 is activated to generate a signal shaped like S7 of FIG. 6, thereby turning on the switching device Q1 of the inverting section 12.

When the signals S6 are supplied from the synchronization detecting section 15 to the synchronization control section 25, the counter 25a of the synchronization control section detects the intervals T1 between the rising edges of the synchronizing signals or the intervals T2 between falling edges of the signals, so as to output the detected values to the comparator 25b. The comparator 25b compares the values 52 of the counter (showing the edge intervals) with the reference value 53. If it is found that the intervals T1 between the rising edges or the intervals T2 between the falling edges are larger than the reference value, then the comparator 25b generates a high output, so that the signal S6 (51) of the synchronization detecting section would be supplied through the AND gate 25d to the flip flop 24.

Then the current detecting section 16 detects the magnitude of the current which flows through the secondary coil L3 of the transformer. The detected current signals are sent to the comparator 18, and the comparator 18 compares the detected current signals with the signal set by the output setting section 17. Then the comparator 18 sends output signals to the register incrementing/decrementing section 19 which increments and decrements the register value. Then the register incrementing/decrementing section 19 increments or decrements the register value which is set in the register 21, in accordance with the synchronizing signals and the output signals of the comparator 18.

Meanwhile, the counter 22 receives the counting values which have been set in the register 21, and the counter 22 counts down the values in accordance with the clock signals from the clock generating section 23. When the counting-down arrives to zero, the counter generates an output to reset the flip flop 24. When the flip flop 24 is reset, the driving section outputs a low output shaped like S7 of FIG. 6, so as to turn off the switching device Q1.

Now an abnormal operation will be described in which the abnormality is shaped like the signal shown in a region A of FIG. 6.

This is the case in which a high frequency is inputted. The synchronization detecting section 15 generates signals shaped like S6' in synchronization with signals S5', so that the signals S6' would be inputted into the synchronization control section 25. Then the counter 25a of the synchronization control section detects the intervals T1 between the rising edges of the synchronizing signal pulses or the intervals T2 between the falling edges of the same signal pulses, so as to output the detected values to the comparator 25b. The comparator 25b compares the edge interval values 52 of the counter with the reference value 53. The rising edge intervals T1 or the falling edge intervals T2 are smaller than the reference value, and therefore, the output 54 of the comparator 25b becomes low. Because the output 54 of the comparator 25b is low, the output 55 of the AND gate 25d becomes low all the time, so that the output 51 of the synchronization detecting section 15 cannot be transmitted to the flip flop 24.

That is, during the time when the output of the comparator is low, one of the inputs of the AND gate is low all the time, and therefore, the output of the AND gate is low all the time. Consequently, the flip flop is reset, with the result that the switching device Q1 is turned off. Therefore, the current which flows through the switching device Q1 is blocked, thereby protecting the switching device Q1.

In the conventional apparatus, if high frequency noises are induced in the synchronization detecting section 15, the switching device Q1 is also turned on and off, and during this occurrence, an overcurrent destroys the switching device Q1.

Meanwhile, according to the present invention, the edge intervals of the high frequency noise are detected, so that, when the edge intervals are less than the reference value, the switching device Q1 would be turned off. Thus damages to the switching device Q1 can be prevented, thereby improving the reliability of the microwave heating apparatus.

What is claimed is:

1. A microwave heating apparatus comprising:

a rectifying section for rectifying an AC power input;

an inverting section for generating high frequency voltages corresponding to output signals of said rectifying section by being turned on/off in accordance with driving signals of a driving section;

a microwave generating section for generating microwaves in response to output signals of said inverting section;

a synchronization detecting section for detecting synchronizing signals from the output signals of said inverting section, and making an output signals; and a flip flop for being set and reset by output signals of said synchronization detecting section, to control said driving section, and the apparatus further comprising:

a synchronization control section connected between said synchronization detecting section and said flip flop, wherein said synchronization control section detects periods of the output signals of said synchronization detecting section to compare it with a reference value so as to reset said flip flop upon encountering a period smaller than the reference value, whereby said driving section is prevented from driving said inverting section.

2. The apparatus as claimed in claim 1, wherein said synchronization control section comprises:

a counter connected to the output signals of said synchronization detecting section;

a data setting section for setting a reference value;

an AND gate for receiving an output of said comparator and the output of said synchronization detecting section through its two input terminals and connecting its output to said flip flop.

* * * * *